United States Patent
Crane

(10) Patent No.: US 11,686,511 B2
(45) Date of Patent: *Jun. 27, 2023

(54) MOTOR TEMPERATURE CONTROL TECHNIQUE WITH TEMPERATURE OVERRIDE

(71) Applicant: Johnson Controls Technology Company, Auburn Hills, MI (US)

(72) Inventor: Curtis Christian Crane, York, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 316 days.

This patent is subject to a terminal disclaimer.

(21) Appl. No.: 17/000,717

(22) Filed: Aug. 24, 2020

(65) Prior Publication Data

US 2020/0386460 A1  Dec. 10, 2020

Related U.S. Application Data

(63) Continuation of application No. 16/234,549, filed on Dec. 27, 2018, now Pat. No. 10,782,057.

(Continued)

(51) Int. Cl.
*F25B 31/00* (2006.01)
*H02K 11/35* (2016.01)
(Continued)

(52) U.S. Cl.
CPC .......... *F25B 31/008* (2013.01); *F25B 31/006* (2013.01); *F25B 41/20* (2021.01);
(Continued)

(58) Field of Classification Search
CPC ........ F25B 41/20; F25B 49/02; F25B 49/022; F25B 49/025; F25B 25/005;
(Continued)

(56) References Cited

U.S. PATENT DOCUMENTS 5,924,847 A * 7/1999 Scaringe ............... F04D 29/058
                                                        417/42
6,032,472 A   3/2000 Heinrichs et al.
(Continued)

FOREIGN PATENT DOCUMENTS

CN    103119382 A   5/2013
CN    104075473 A   10/2014
(Continued)

OTHER PUBLICATIONS

Korean Office Action for KR Application No. 10-2020-7021956, dated Jun. 30, 2021, 11 pgs.

(Continued)

*Primary Examiner* — Emmanuel E Duke
(74) *Attorney, Agent, or Firm* — Fletcher Yoder, P.C.

(57) ABSTRACT

A method of cooling a motor coupled to a compressor of a chiller includes adjusting a position of a motor cooling valve located fluidly between the motor and a refrigerant source, using a motor temperature control system coupled to the motor cooling valve to regulate an amount of refrigerant introduced into the motor from the condenser according to a temperature control scheme performed as a function of a monitored temperature in the motor, a first temperature threshold, and a second temperature threshold lower than the first temperature threshold. The temperature control scheme includes a motor cooling control process that adjusts the position of the motor cooling valve based on a stator winding temperature set point relating to stator windings of the motor. A proportionally limited close command override associated with a first temperature range above the second temperature threshold proportionally limits a close command provided to the motor cooling valve.

20 Claims, 6 Drawing Sheets

Related U.S. Application Data

(60) Provisional application No. 62/611,672, filed on Dec. 29, 2017.

(51) Int. Cl.
   *H02K 7/09* (2006.01)
   *F25B 49/02* (2006.01)
   *H02K 7/08* (2006.01)
   *F25B 41/20* (2021.01)
   *H02K 11/25* (2016.01)
   *H02P 29/64* (2016.01)
   *F25B 25/00* (2006.01)

(52) U.S. Cl.
   CPC ............ *F25B 49/02* (2013.01); *F25B 49/022* (2013.01); *F25B 49/025* (2013.01); *H02K 7/083* (2013.01); *H02K 7/09* (2013.01); *H02K 11/25* (2016.01); *H02K 11/35* (2016.01); *H02P 29/64* (2016.02); *F25B 25/005* (2013.01); *F25B 2339/047* (2013.01); *F25B 2500/08* (2013.01); *F25B 2600/2515* (2013.01); *F25B 2700/21157* (2013.01)

(58) Field of Classification Search
   CPC ............ F25B 2339/047; F25B 2500/08; F25B 2600/2515; F25B 2600/25; F25B 2700/21157; H02K 7/083; H02K 7/09; H02K 11/25; H02K 11/35; H02P 29/64
   See application file for complete search history.

(56) References Cited

U.S. PATENT DOCUMENTS

| | | |
|---|---|---|
| 6,324,858 B1 | 12/2001 | Holden |
| 6,675,594 B2 | 1/2004 | Choi et al. |
| 9,261,299 B2 | 2/2016 | Porter et al. |
| 9,746,227 B2 | 8/2017 | Peng et al. |
| 2004/0194497 A1 | 10/2004 | Sasaki et al. |
| 2016/0245559 A1 | 8/2016 | Yang et al. |

FOREIGN PATENT DOCUMENTS

| | | | |
|---|---|---|---|
| CN | 104913403 | 9/2015 | |
| CN | 104949366 A * | 9/2015 | ............... F25B 1/00 |
| CN | 106247655 A | 12/2016 | |
| EP | 730128 | 6/1999 | |
| JP | 2014163624 | 9/2014 | |
| KR | 20090074781 A | 7/2009 | |
| KR | 20160056954 A * | 5/2016 | ........... F25B 31/006 |
| WO | 2017175014 | 10/2017 | |

OTHER PUBLICATIONS

Chinese Office Action for CN Application No. 201880089018.X, dated Jul. 26, 2021, 6 pgs.

* cited by examiner

MOTOR TEMPERATURE CONTROL TECHNIQUE WITH TEMPERATURE OVERRIDE

CROSS-REFERENCE TO RELATED APPLICATION

This application is a continuation of U.S. patent application Ser. No. 16/234,549, entitled "MOTOR TEMPERATURE CONTROL TECHNIQUE WITH TEMPERATURE OVERRIDE," filed Dec. 27, 2018, which claims priority to and the benefit of U.S. Provisional Application No. 62/611,672, entitled "MOTOR TEMPERATURE CONTROL TECHNIQUE WITH TEMPERATURE OVERRIDE," filed Dec. 29, 2017, each of which is hereby incorporated by reference in its entirety for all purposes.

BACKGROUND

This application relates generally to vapor compression systems such as chillers, and more specifically to a compressor and compressor motor of a chiller.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Vapor compression systems (e.g., chillers) utilize a working fluid, typically referred to as a refrigerant, which changes phase between vapor, liquid, and combinations thereof in response to being subjected to different temperatures and pressures associated with operation of the vapor compression system. For example, a heating, ventilation, air conditioning, and refrigeration (HVAC&R) system may include a chiller, which is a type of vapor compression system that cycles a refrigerant to remove heat from, or cool, a flow of water traversing tubes that extend through a chiller evaporator. The chilled water flow may be directed to nearby structures to absorb heat, or provide cooling, before being cycled back to the chiller evaporator to be cooled once again.

Chillers utilize compressors, such as centrifugal compressors, to compress the refrigerant as part of a refrigeration cycle, and to motivate the refrigerant through the chiller. Such compressors include a motor which rotates a shaft to operate the compressor. Operation of the motor generates heat within the motor, which, if uncontrolled, can degrade the performance of the motor over time. Indeed, in certain situations, once a certain temperature of the motor is reached, a fault condition is indicated in a control system of the chiller, which causes the chiller to shutdown to allow the motor to return to an acceptable operating temperature.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

An embodiment includes a chiller system having a refrigeration circuit having a compressor, a condenser, and an evaporator in fluid communication. The chiller system also includes motor configured to drive the compressor. The motor is fluidly coupled to the condenser to allow the motor to receive refrigerant from the condenser to cool the motor. The motor includes a housing, a rotor positioned within a stator having stator windings, electromagnetic (EM) bearings configured to support the rotor, and a magnetic bearing controller (MBC) configured to regulate operation of the EM bearings, the MBC having a heat sink. The chiller system also includes a motor cooling valve positioned fluidly between the motor and the condenser. The motor cooling valve is adjustable continuously between a fully open position and a fully closed position to regulate the amount of refrigerant introduced into the motor between full refrigerant flow and no refrigerant flow, respectively. A motor temperature control system is communicatively coupled to the motor cooling valve and configured to adjust the opening and closing of the motor cooling valve according to a temperature control scheme performed as a function of a monitored temperature in the motor, a first temperature threshold, and a second temperature threshold lower than the first temperature threshold. The temperature control scheme includes a motor cooling control process configured to adjust the opening and closing of the motor cooling valve based at least in part on a stator winding temperature set point; and a proportionally limited close command override associated with a first temperature range above the second temperature threshold and configured to proportionally limit a close command provided to the motor cooling valve.

Another embodiment includes a method of cooling a motor coupled to a compressor of a chiller includes adjusting a position of a motor cooling valve located fluidly between the motor and a refrigerant source, using a motor temperature control system coupled to the motor cooling valve to regulate an amount of refrigerant introduced into the motor from the condenser according to a temperature control scheme performed as a function of a monitored temperature in the motor, a first temperature threshold, and a second temperature threshold lower than the first temperature threshold. The temperature control scheme includes a motor cooling control process that adjusts the position of the motor cooling valve based on a stator winding temperature set point relating to stator windings of the motor. A proportionally limited close command override associated with a first temperature range above the second temperature threshold proportionally limits a close command provided to the motor cooling valve.

Another embodiment includes a motor temperature control system for a motor drivingly coupled to a compressor of a chiller system. The motor temperature control system is configured to communicatively couple to a motor cooling valve to regulate an amount of refrigerant introduced into the motor from a refrigerant source according to a temperature control scheme. The motor temperature control system comprises memory circuitry storing the temperature control scheme and processing circuitry configured to implement the temperature control scheme. The temperature control scheme is performed as a function of a monitored temperature in the motor, a first temperature threshold, and a second temperature threshold lower than the first temperature threshold and includes a motor cooling control process configured to adjust the opening and closing of the motor cooling valve based on a stator winding temperature set point relating to stator windings of the motor. A proportionally limited close command override associated with a first temperature range above the second temperature threshold proportionally limits a close command provided to the motor cooling valve.

DRAWINGS

Various aspects of this disclosure may be better understood upon reading the following detailed description and upon reference to the drawings in which.

Figure 4:
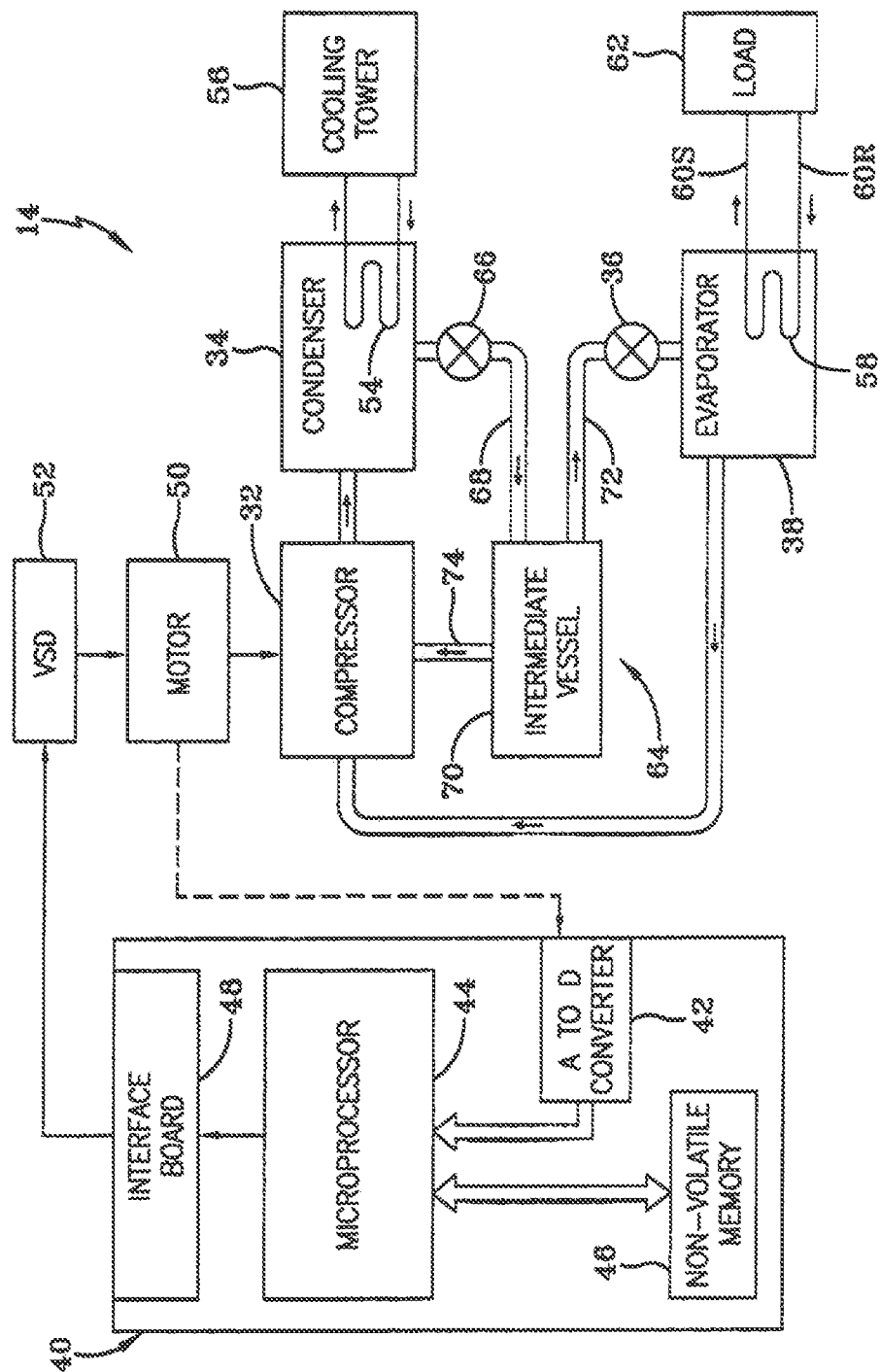
FIG. 4 is a schematic illustration of another embodiment of the vapor compression system of FIG. 2, in accordance with an aspect of the present disclosure.
Figure 5:
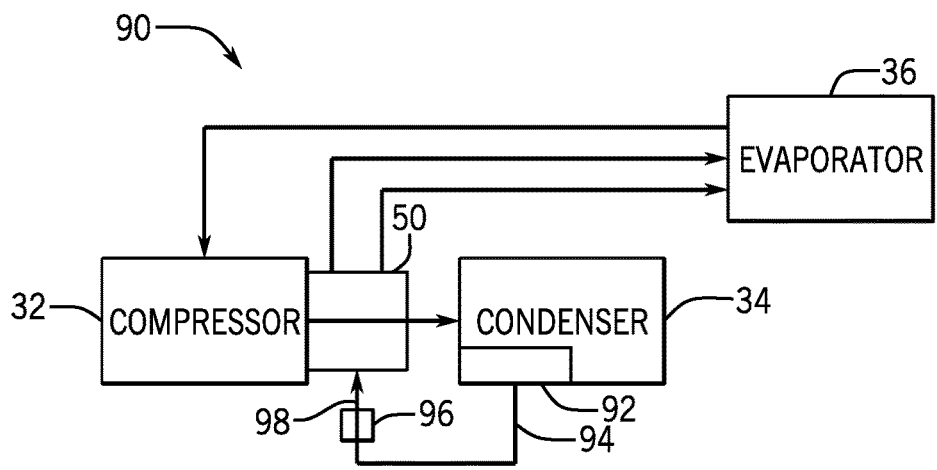
FIG. 5 is a schematic illustration of an embodiment of a cooling system configured to cool a compressor motor of the vapor compression system of FIGS. 1-4, in accordance with an aspect of the present disclosure.
Figure 6:
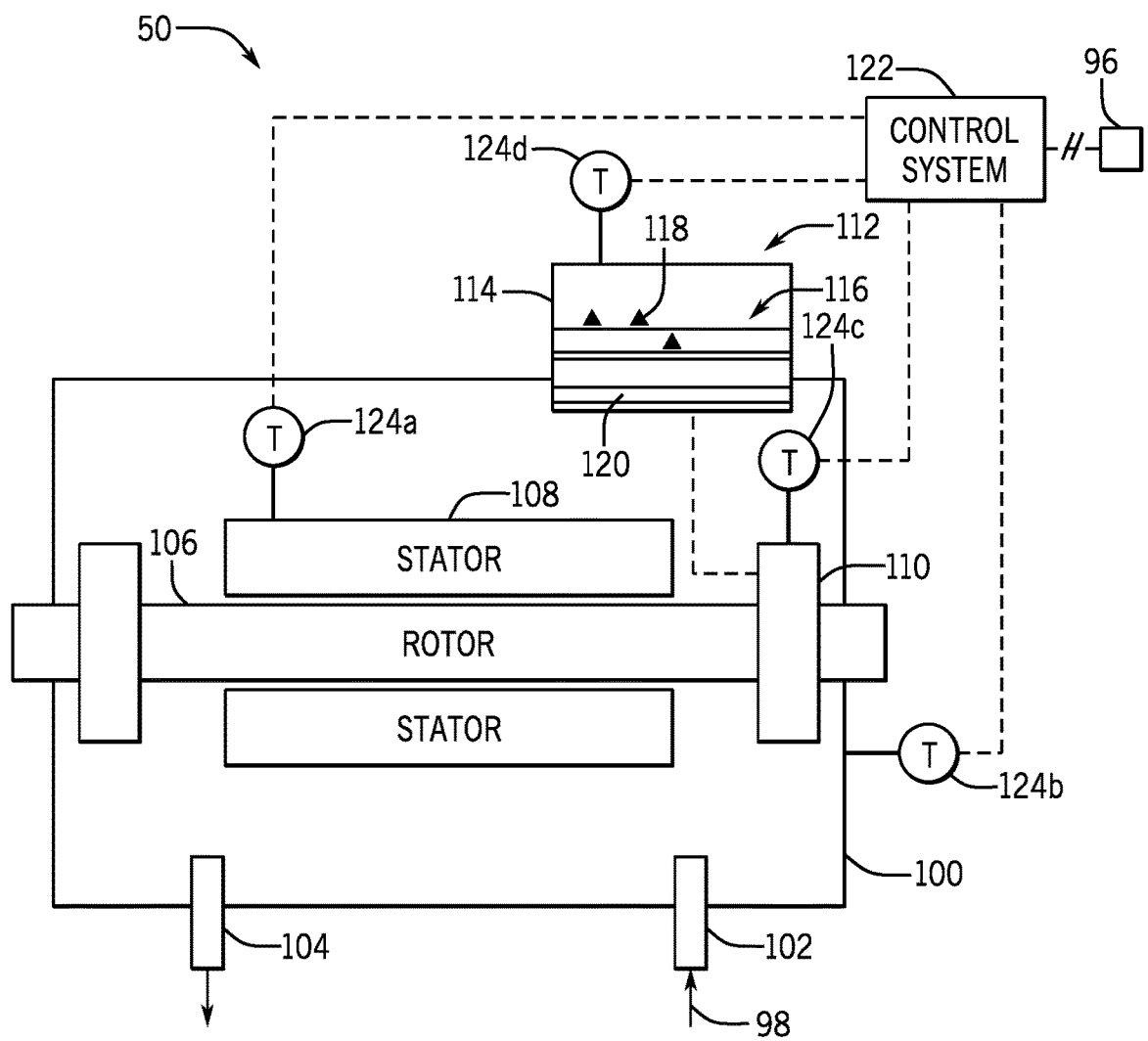
Figure 7:
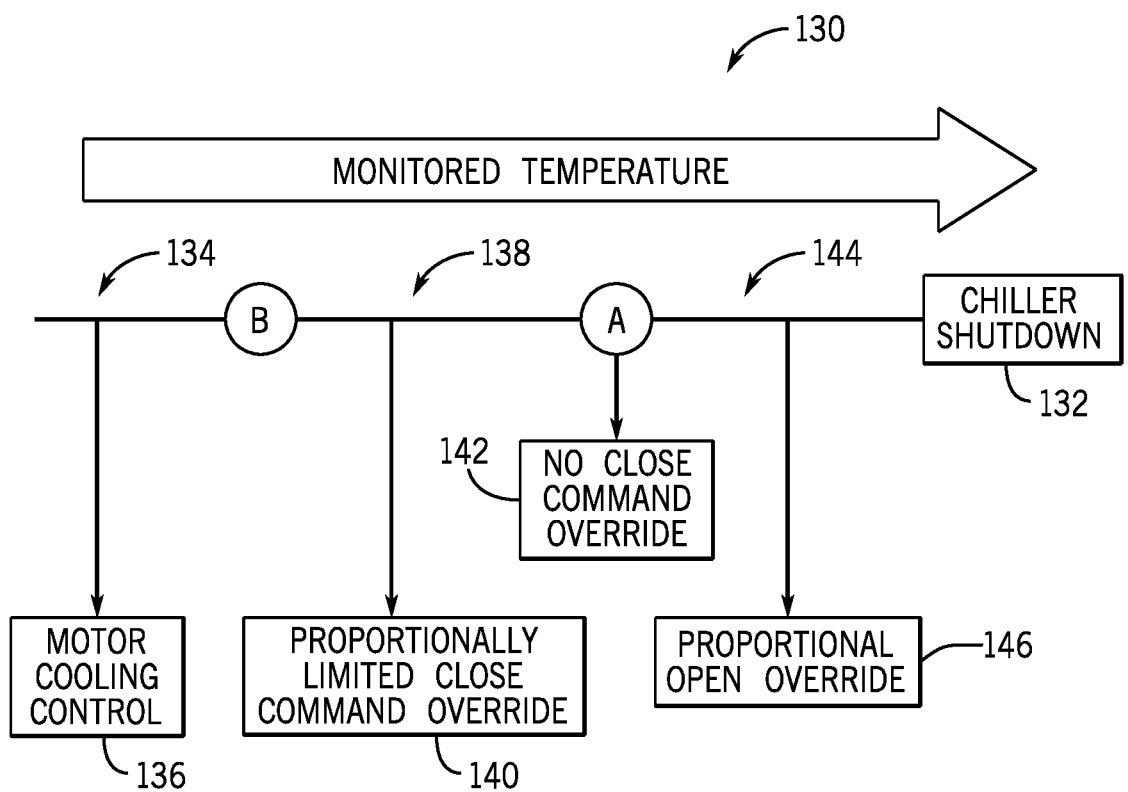

FIG. 6 is a schematic illustration of an embodiment of the compressor motor of FIGS. 1-5 having a plurality of temperature sensors that provide temperature feedback to a motor temperature control system, in accordance with an aspect of the present disclosure; and FIG. 7 is a process flow diagram depicting an embodiment of a temperature control scheme that includes various overrides as a function of a monitored motor temperature as the monitored motor temperature approaches a chiller shutdown fault temperature, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, chiller compressors include a motor which rotates a shaft to operate the compressor. Operation of the motor generates heat within the motor, which, if uncontrolled, can degrade the performance of the motor over time. Certain control schemes of the present disclosure may include a motor cooling control scheme that causes refrigerant to be introduced into the motor for cooling purposes. Introduction of the refrigerant may be performed using, for example, PID control based on a difference between a certain temperature setpoint for a part of the motor (e.g., the stator windings of the motor) and a temperature measurement of that part of the motor. The temperature setpoint may be calculated using any one or a combination of a number of different measured temperatures, such as, for example, a motor housing temperature, a stator winding temperature, a motor bearing temperature, and a motor bearing controller (MBC) heatsink temperature. In one embodiment, a temperature setpoint for the stator windings is calculated based on a measured motor housing temperature and a measured stator winding temperature. An example of a motor cooling control scheme is set forth in U.S. Pat. No. 9,574,805, which is incorporated herein by reference in its entirety for all purposes.

Certain control schemes of the present disclosure use the motor cooling control scheme while certain temperature conditions within the motor are within a motor cooling control operation range. However, in situations where the certain temperature conditions within the motor are above the motor cooling control operation range, the motor cooling control is partially or fully overridden to effect sufficient cooling of the motor to avoid chiller shutdown. Whether the motor cooling control is partially or fully overridden may depend on certain temperatures of the motor. In this way, the control schemes of the present disclosure include a variety of operating regimes that depend on, among other parameters (e.g., the head pressure of the compressor), certain monitored temperatures of the motor. By way of non-limiting example, these monitored temperatures may include a motor winding temperature, a motor bearing temperature, and/or a motor bearing controller (MBC) heatsink temperature.

The control techniques of the present disclosure may be used in a variety of systems. However, to facilitate discussion, examples of systems that may incorporate the control techniques of the present disclosure are depicted in FIGS. 1-4, which are described hereinbelow.

Figure 1:
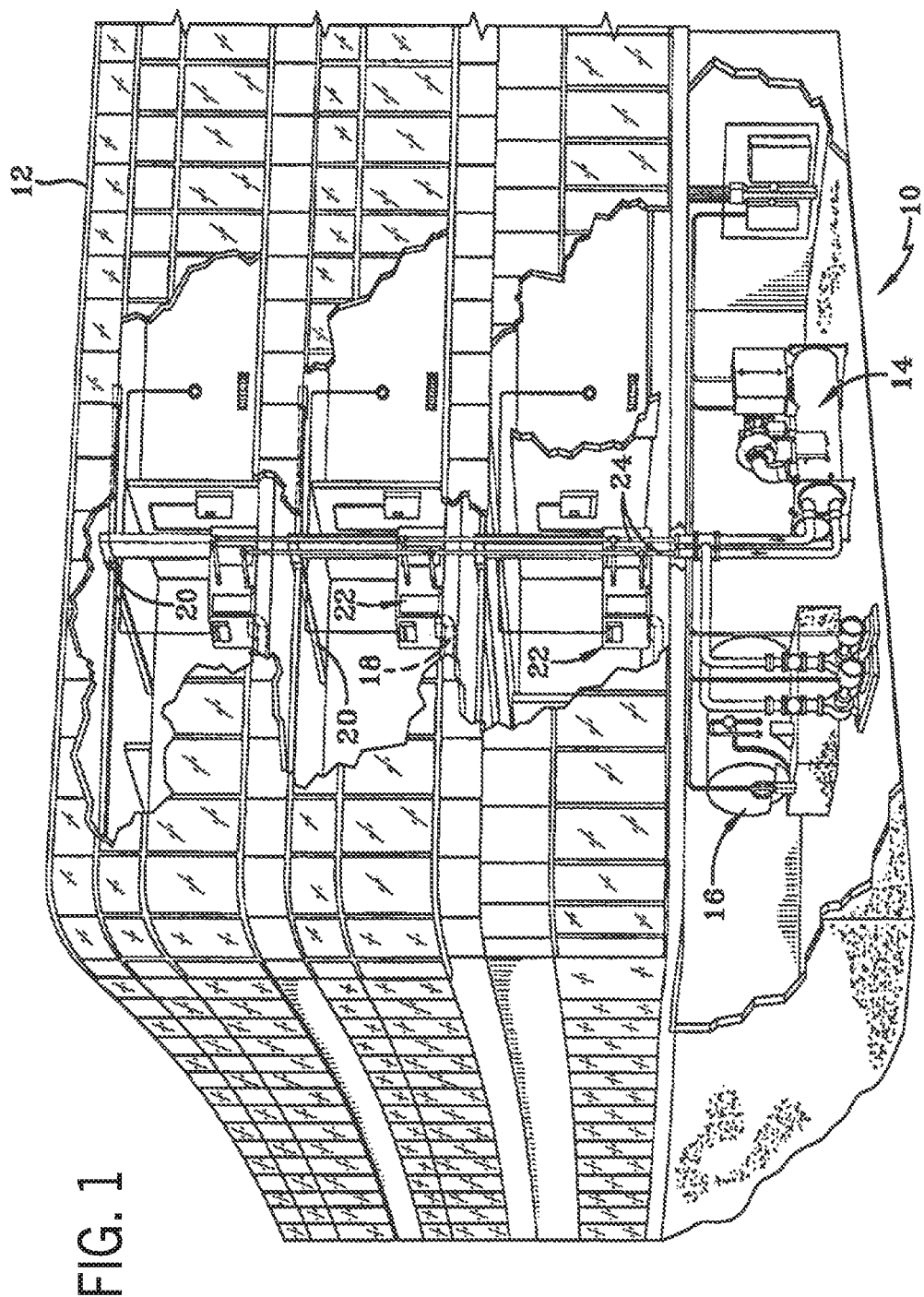
FIG. 1 is a perspective view of a building that may utilize an embodiment of a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, and air conditioning (HVAC) system 10 in a building 12 for a typical commercial setting. The HVAC system 10 may include a vapor compression system 14 that supplies a chilled liquid, which may be used to cool the building 12. The HVAC system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC system 10. The HVAC system 10 is shown with a separate air handler on each floor of building 12, but in other embodiments, the HVAC system 10 may include air handlers 22 and/or other components that may be shared between or among floors.

Figure 2:
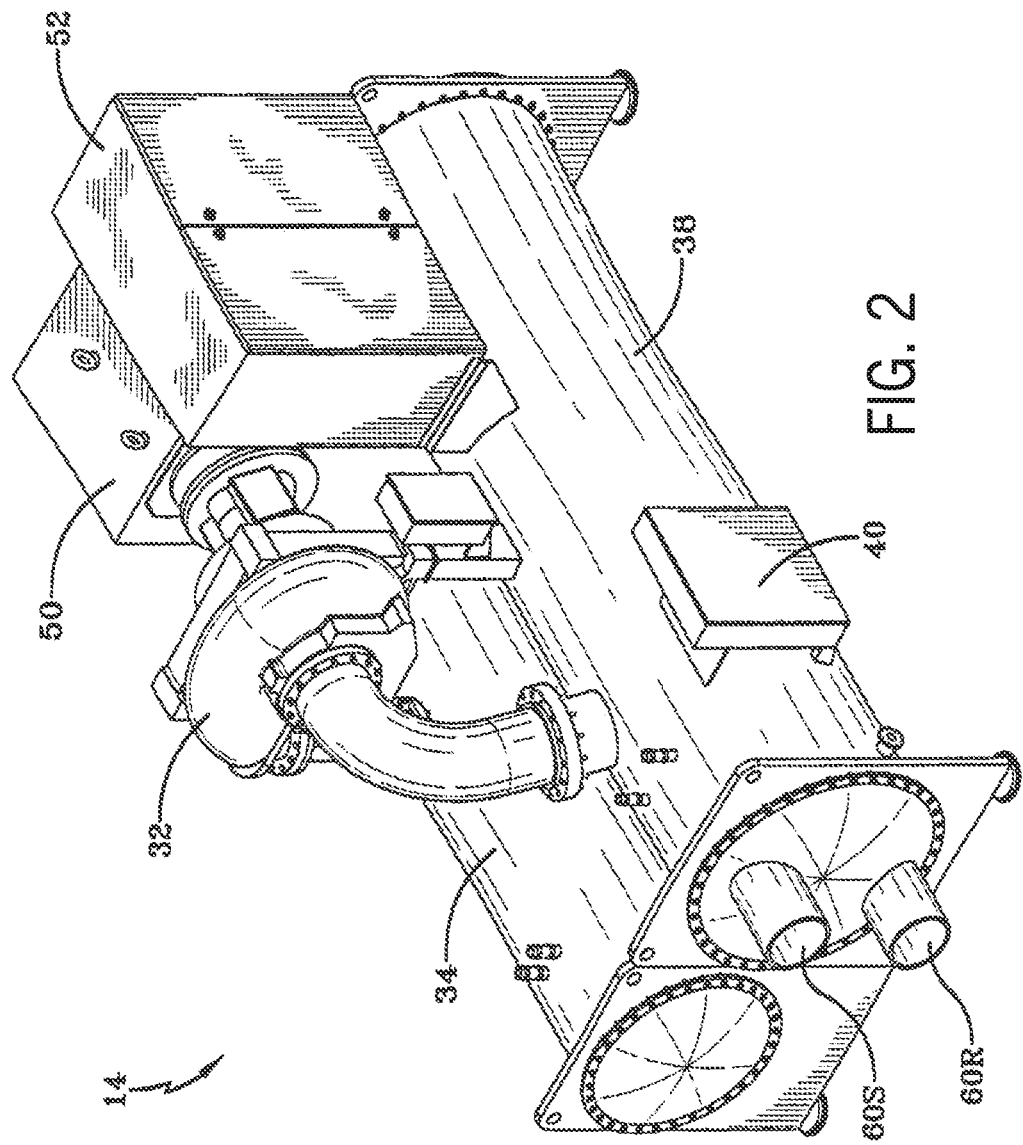
FIG. 2 is a perspective view of an embodiment of a vapor compression system, in accordance with an aspect of the present disclosure.
Figure 3:
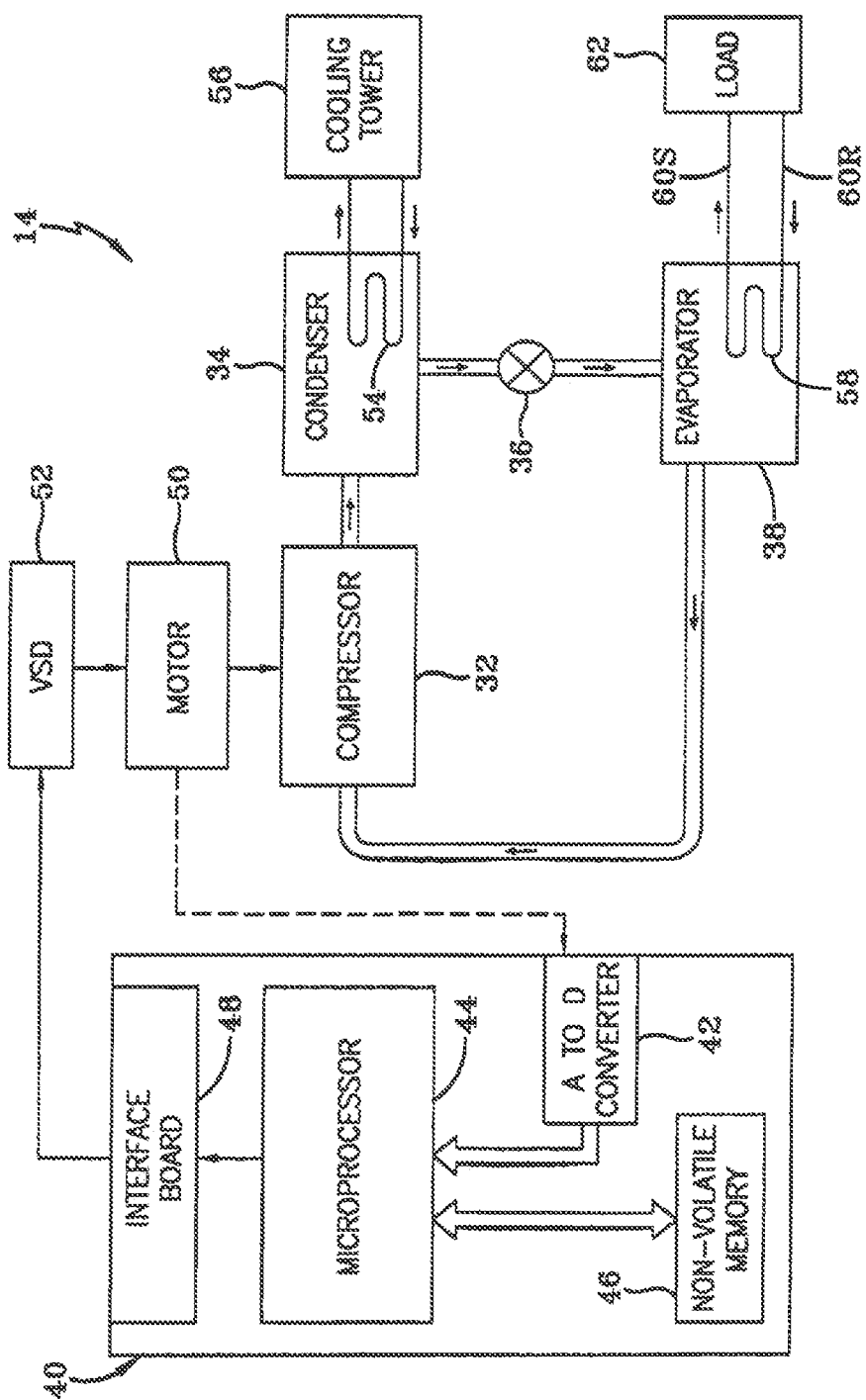
FIG. 3 is a schematic illustration of an embodiment of the vapor compression system of FIG. 2, in accordance with an aspect of the present disclosure.

FIGS. 2 and 3 are embodiments of the vapor compression system 14 that can be used in the HVAC system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 (e.g., controller) that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro-olefin (HFO), "natural" refrigerants like ammonia (NH3), R-717, carbon dioxide (CO2), R-744, or hydrocarbon based refrigerants, water vapor, refrigerants with low global warming potential (GWP), or any other suitable refrigerant. In some embodiments, the vapor compression system 14 may be configured to efficiently utilize refrigerants having a normal boiling point of about 19 degrees Celsius (66 degrees Fahrenheit or less) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The refrigerant liquid from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The refrigerant liquid delivered to the evaporator 38 may absorb heat from another cooling fluid, which may or may not be the same cooling fluid used in the condenser 34. The refrigerant liquid in the evaporator 38 may undergo a phase change from the refrigerant liquid to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the refrigerant vapor exits the evaporator 38 and returns to the compressor 32 by a suction line to complete the cycle.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the refrigerant liquid received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the refrigerant liquid because of a pressure drop experienced by the refrigerant liquid when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the refrigerant liquid exiting the condenser 34 because of the expansion in the expansion device 66 and/or the intermediate vessel 70. The liquid from intermediate vessel 70 may then flow in line 72 through a second expansion device 36 to the evaporator 38.

As set forth above, the motor 50 used in the vapor compression system 14 of FIGS. 1-4 may generate heat during operation and, accordingly, is generally cooled using refrigerant provided from the condenser 34. Specifically, introduction of the refrigerant into the motor 50 is regulated according to the motor cooling techniques of the present disclosure. To help illustrate, FIG. 5 schematically depicts an example of the manner in which the motor 50 may be cooled using refrigerant from the condenser 34. Specifically, FIG. 5 depicts a cooling system 90 that circulates refrigerant to the motor 50 to cool the motor 50. It should be noted that portions of the vapor compression system 14 are not shown for clarity.

As set forth above, the compressor 32 compresses the refrigerant (which generally enters as a gas), raising the temperature of the refrigerant gas as it is compressed. The pressurized, high temperature refrigerant gas then flows to the condenser 34 where the high pressure refrigerant gas is condensed to a high pressure liquid 92. A portion 94 of the refrigerant liquid from the condenser 34 is routed through a third expansion device 96 (e.g., an electronic expansion valve), referred to herein as a motor cooling valve 96, where the liquid refrigerant is converted into a low temperature mist 98. The refrigerant mist 98 then is sent to the motor 50, where it is used to cool the motor 50. Specifically, the liquid portion of the refrigerant mist 98 draws heat from the motor 50 as it evaporates, undergoing a phase change. Liquid refrigerant that is not evaporated is sent from the motor back to evaporator 36 where it evaporates. Refrigerant gas from the motor 50 may be returned to the refrigeration circuit at any point from the evaporator 36 to the gas refrigerant inlet of the compressor 32. In FIG. 5, refrigerant gas and refrigerant liquid from the motor 50 are shown as being returned to the evaporator 36 via separate lines, but other arrangements may be used (e.g., combined flow of the refrigerant phases, flows directed to other parts of the circuit).

A schematic representation of the motor 50 is shown in FIG. 6. As illustrated, the motor 50 includes a housing 100 having a refrigerant inlet 102 and a refrigerant outlet 104. The refrigerant inlet 102 is fluidly coupled to the motor cooling valve 96 of FIG. 5, and allows the refrigerant mist 98 to be introduced into the housing 100 of the motor 50 to cool various internal components. Specifically, the refrigerant mist 98 is circulated within the housing 100 to cool the various motor components, and the refrigerant gas and/or refrigerant liquid is directed out of the housing 100 via the refrigerant outlet 104. While only one refrigerant inlet 102 and one refrigerant outlet 104 are illustrated, in certain embodiments there may be a plurality (two or more) of the refrigerant inlet 102 and refrigerant outlet 104 (e.g., to direct refrigerant to specific parts of the motor 50 and/or to collect refrigerant from different portions of the motor 50.

The motor 50 includes a variety of components, only some of which are shown in FIG. 6. The components include, among other things, a rotor 106 positioned within a stator 108. The stator 108 generally includes stator windings, such as copper windings around a ferromagnetic core material (e.g., laminated steel). The rotor 106 is configured to attach to the compressor 32, and drives the shaft of the compressor 32 during operation.

Electromagnetic (EM) bearings 110 support the rotor 106 within the motor 50 using a magnetic field. In certain embodiments, the motor 50 may also include mechanical bearings as a backup to the EM bearings 110. Operational parameters of the EM bearings 110 are monitored and controlled by a magnetic bearing controller (MBC) 112, which may be partially or fully disposed within the housing 100. In other embodiments, the MBC 112 may be positioned on an exterior of the housing 100, or entirely separate from the housing 100. The illustrated MBC 112 includes an enclosure 114 that is mounted to the motor housing 50. The enclosure 114 houses one or more circuit boards 116 to which various electronic components 118 may be mounted (e.g., processors, memory). The electronic components may be configured to monitor and control operational parameters of the EM bearings 110, among other things.

During operation of the motor 50, the electronic components 118 generate heat, which is removed to prevent damage to the components. Generally, heat is conducted away from the electronic components 118 via the enclosure 114, which may be a heat sink for the MBC 112. In certain embodiments, the MBC 112 may include a heat sink layer 120 to provide for additional thermal conduction away from the circuit boards 116 and the electronic components 118.

To facilitate temperature control of the motor 50, a motor temperature control system 122 may be associated with the motor 50. As an example, the motor temperature control system may include one or more proportional-integral-derivative (PID) controllers. The one or more PID controllers may be implemented as standalone control devices, or as hardware and/or software modules associated with the control panel 40. The control system 122 is communicatively coupled to at least the motor cooling valve 96, as well as a plurality of temperature sensors 124 (e.g., thermocouples, thermistors) associated with any one or a combination of the various components of the motor 50. The temperature sensors 124 provide temperature feedback to the motor temperature control system 122. For instance, in the illustrated embodiment, the temperature sensors 124 include a stator winding temperature sensor 124a that provides stator winding temperature feedback, a motor housing temperature sensor 124b that provides motor housing temperature feedback, a bearing temperature sensor 124c that provides bearing temperature feedback, and a MBC heatsink temperature sensor 124d that provides MBC heatsink temperature feedback. The motor temperature control system 122 may use any one or a combination of this feedback to control operation (e.g., opening and closing) of the motor cooling valve 96.

As may be appreciated, opening of the motor cooling valve 96 may increase the amount of refrigerant mist 98 introduced into the motor 50 to effect cooling of the motor components. Conversely, closing the motor cooling valve 96 reduces the amount of refrigerant mist 98 introduced into the motor 50, which may reduce the cooling rate of the motor components or may allow them to warm, depending on operating conditions. In accordance with present embodiments, a number of different temperature control processes may be used by the motor temperature control system 122, depending on, among other things, the temperature feedback provided by the temperature sensors 124. A schematic representation of these different control regimes is shown in FIG. 7.

Specifically, FIG. 7 illustrates a temperature control scheme 130 that is dependent upon the highest measured temperature of the stator windings. In another embodiment, the average highest temperature may be used for the control scheme 130. In other embodiments, the temperature control scheme 130 may be dependent upon the bearing temperature, such as a specific bearing temperature, the highest bearing temperature based on a series of temperature readings, or an average bearing temperature. In still further embodiments, the temperature control scheme 130 may be based on a specific MBC temperature, a highest MBC temperature from a series of MBC temperature readings, or an average MBC temperature.

The temperature control scheme 130 includes a series of defined temperatures extending from a lowest operating temperature (the leftmost side of the scheme) to a chiller shutdown fault temperature 132. According to the temperature control scheme 130, a first threshold "A" is defined that is below the chiller shutdown fault temperature 132, and a second threshold "B" is defined that is below the first threshold A. While the first threshold A and the second threshold B are described as being specific temperatures to facilitate discussion, it should be noted that the first threshold A and the second threshold B may account for minor variations in measured temperatures, tolerances, and so forth.

In accordance with present embodiments, different control strategies are employed by the control system 122 depending on where the measured temperature falls along the spectrum shown in FIG. 7. Specifically, as the temperature measurement continues to rise toward the chiller shutdown fault temperature, a series of overrides are implemented on top of a regular temperature control strategy.

Referring to the temperature control scheme 130, when the appropriate measured temperature of the stator windings is below the second threshold B (e.g., a normal operating temperature range 134), a motor cooling control strategy 136 is employed where the opening and closing of the motor cooling valve 96 is controlled based at least in part on a calculated stator winding temperature set point (for example based on a difference between the calculated stator winding temperature set point and the measured stator winding temperature). The stator winding temperature set point may be calculated using the motor housing temperature (which may be correlated to the stator winding temperature), or a combination of the motor housing temperature and the stator winding temperature. Whether the motor housing temperature alone or the motor housing temperature in combination with the stator winding temperature is used to calculate the stator winding temperature set point may depend on operating conditions of the vapor compression system 14. By way of non-limiting example, the manner in which the stator winding temperature set point is calculated may depend on whether the vapor compression system 14 has a high head pressure or a low head pressure, where the head pressure is defined as the pressure difference between the condenser 34 and evaporator 36.

It should be noted that the motor cooling control 136 may operate the motor cooling valve 96 between a fully open position and a fully closed position while the temperature is in the normal operating range 134. Thus, in accordance with the temperature control scheme 130 of FIG. 7, at and below the second threshold B, a maximum close command for the motor cooling valve 96 is allowed, meaning that the motor cooling control 136 may cause the cooling system 90 to operate with substantially no cooling flow to the motor 50. However, at a temperature range 138 above the second threshold B, a proportionally limited close command override 140 is utilized on top of the motor cooling control 130, where the amount that the motor cooling control 136 can command the motor cooling valve 96 to close is proportionally limited based on the temperature measurement (how far above the second threshold B the temperature measurement is).

Once the first threshold A is reached, a no close command override 142 is enforced in addition to the proportionally limited close command override 140. Here, the motor cooling control 136 is overridden to disallow a close command to the motor cooling valve 96. In other words, the motor cooling valve 96 is forced to remain at least partially open.

At a high operating temperature range 144 above the first threshold A, the motor cooling control 136 is overridden and a proportional open override 146 is employed. Here, the motor cooling valve 96 is commanded to open proportional to how far above the first threshold A the temperature is. However, if the motor cooling control 136 requires a higher level of opening than the proportional open override 146, the motor cooling control 136 opening level is used. In other words, the maximum opening value of the motor cooling control 136 and all overrides is used to command the opening of the motor cooling valve 96.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A chiller system, comprising:
a refrigeration circuit having a compressor and a condenser;
a motor configured to drive the compressor;
a temperature sensor configured to provide a temperature of the motor;
a conduit fluidly coupling the motor and the condenser to facilitate refrigerant flow between the condenser and the motor to cool the motor, wherein the conduit comprises a motor cooling valve configured to transition between an open configuration and a closed configuration to regulate an amount of the refrigerant flow between the condenser and the motor;
a motor temperature control system configured to adjust the motor cooling valve to control the temperature of the motor based on a temperature set point, a first temperature threshold, and a second temperature threshold that is lower than the first temperature threshold, wherein the motor temperature control system is configured to:
alternate the motor cooling valve between the open configuration and the closed configuration based on an open command and a close command; and
override and proportionally limit the close command based on the temperature of the motor exceeding the second temperature threshold to limit transition of the motor cooling valve toward the closed configuration.

2. The chiller system of claim 1, wherein the motor temperature control system is configured to proportionally limit the close command based on an amount by which the temperature of the motor has exceeded the second temperature threshold.

3. The chiller system of claim 1, wherein the motor temperature control system is configured to issue a no close command override of the close command to the motor cooling valve based on the temperature of the motor being above the first temperature threshold, wherein the no close command override disallows providing the close command to the motor cooling valve.

4. The chiller system of claim 1, wherein the motor temperature control system is configured to issue a proportional open override of the open command to the motor cooling valve based on the temperature of the motor being between the first temperature threshold and a chiller shutdown temperature greater than the first temperature threshold, wherein the proportional open override command instructs the motor cooling valve to open in proportion to an amount by which the temperature of the motor exceeds the first temperature threshold.

5. The chiller system of claim 1, wherein the motor comprises a rotor positioned within a stator including stator windings.

6. The chiller system of claim 5, wherein the temperature sensor is positioned proximate to the stator windings and configured to provide the temperature of the motor as a temperature of the stator windings.

7. The chiller system of claim 1, wherein the motor comprises a rotor positioned within a stator, electromagnetic bearings configured to support the rotor within a housing, and a magnetic bearing controller configured to regulate operation of the electromagnetic bearings.

8. The chiller system of claim 7, wherein the temperature sensor is configured to provide the temperature of the motor as a temperature of the housing.

9. A method of temperature management of a motor drivingly coupled to a compressor of a chiller system, the method comprising:
monitoring, via a temperature sensor, a temperature of the motor drivingly coupled to the compressor in a refrigeration loop of the chiller system including a condenser, wherein refrigerant is provided from the condenser to the motor for cooling of the motor;
controlling, via a motor temperature control system, opening and closing of a motor cooling valve through which the refrigerant flows from the condenser to the motor to regulate an amount of the refrigerant introduced into the motor based on a set point for the temperature of the motor, a first temperature threshold, and a second temperature threshold lower than the first temperature threshold;

switching, via the motor temperature control system, between the opening and the closing of the motor cooling valve based on an open command and a close command; and proportionally limiting the close command provided to the motor cooling valve, via the motor temperature control system, based on the temperature of the motor exceeding the second temperature threshold to limit the closing of the motor cooling valve.

10. The method of claim 9, wherein proportionally limiting the close command comprises limiting, via the motor temperature control system, the close command based on an amount by which the temperature of the motor has exceeded the second temperature threshold.

11. The method of claim 9, wherein controlling the opening and closing of the motor cooling valve comprises switching, via the motor temperature control system, the motor cooling valve continuously between a fully open position and a fully closed position to regulate the amount of the refrigerant introduced into the motor between maximum refrigerant flow and minimum refrigerant flow through the motor cooling valve, respectively.

12. The method of claim 9, comprising preventing, via the motor temperature control system, the close command from being provided to the motor cooling valve via a no close command override of the close command issued in response to the temperature of the motor exceeding the first temperature threshold.

13. The method of claim 9, comprising providing the open command, via the motor temperature control system, to open the motor cooling valve in proportion to an amount by which the temperature of the motor exceeds the first temperature threshold.

14. The method of claim 9, wherein monitoring the temperature of the motor comprises detecting, via the temperature sensor, a temperature at a motor housing as the temperature of the motor.

15. The method of claim 9, wherein monitoring the temperature of the motor comprises detecting, via the temperature sensor, a temperature of a stator winding of the motor as the temperature of the motor.

16. The method of claim 9, wherein monitoring the temperature of the motor comprises detecting, via the temperature sensor, a temperature of electromagnetic bearings supporting a rotor of the motor as the temperature of the motor.

17. A motor temperature control system for a motor coupled to a compressor of a chiller system, wherein the motor temperature control system is configured to couple to a motor cooling valve to regulate an amount of refrigerant introduced into the motor from a condenser of the chiller system according to a temperature control scheme, wherein the motor temperature control system comprises:

memory circuitry storing the temperature control scheme; and processing circuitry configured to implement the temperature control scheme, wherein the temperature control scheme comprises:
  a monitored temperature of the motor;
  a first temperature threshold;
  a second temperature threshold lower than the first temperature threshold;
  a motor cooling control process configured to alternate the motor cooling valve between opening and closing based on an open command and a close command for the motor cooling valve; and
  a proportionally limited close command override of the close command that proportionally limits the close command for the motor cooling valve based on the monitored temperature of the motor exceeding the second temperature threshold to limit closing of the motor cooling valve.

18. The motor temperature control system of claim 17, wherein the proportionally limited close command override proportionally limits the close command based on an amount by which the monitored temperature of the motor exceeds the second temperature threshold.

19. The motor temperature control system of claim 17, wherein the temperature control scheme further comprises a no close command override that disallows providing the close command or the proportionally limited close command to the motor cooling valve based on the monitored temperature of the motor exceeding the first temperature threshold.

20. The motor temperature control system of claim 17, wherein the temperature control scheme further comprises a proportional open override of the open command that commands the motor cooling valve to open in proportion to an amount by which the monitored temperature of the motor exceeds the first temperature threshold.

* * * * *